United States Patent [19]

Masuyama et al.

[11] Patent Number: 5,025,415
[45] Date of Patent: Jun. 18, 1991

[54] MEMORY CARD

[75] Inventors: Masaru Masuyama, Sagamihara; Yoshihiro Takemae, Tokyo; Tetsuhiko Endoh, Inagi; Hirosuke Komyoji, Minokamo; Ryuji Tanaka, Kawasaki; Katsuhiko Itakura, Minokamo, all of Japan

[73] Assignees: Fujitsu Limited, Kawasaki; Fujitsu Vlsi Limited, Kasugai, both of Japan

[21] Appl. No.: 412,077

[22] Filed: Sep. 25, 1989

[30] Foreign Application Priority Data

Sep. 28, 1988 [JP] Japan .................. 63-242950

[51] Int. Cl.$^5$ .............................. G11C 5/06
[52] U.S. Cl. ........................ 365/52; 365/64; 365/238.5; 365/230.06; 235/492
[58] Field of Search .......... 365/52, 64, 238.5, 230.06; 235/492

[56] References Cited

U.S. PATENT DOCUMENTS

| | | | |
|---|---|---|---|
| 4,099,253 | 7/1978 | Dooley | 365/238.5 |
| 4,213,177 | 7/1980 | Schmidt | 365/63 |
| 4,214,302 | 7/1980 | Schmidt | 365/63 |
| 4,375,665 | 3/1983 | Schmidt | 365/63 |
| 4,400,794 | 8/1983 | Koos | 365/63 |
| 4,791,607 | 12/1988 | Igarashi et al. | 365/63 |

FOREIGN PATENT DOCUMENTS

| | | | |
|---|---|---|---|
| 61-107591 | 5/1986 | Japan | 365/52 |
| 62-123587 | 6/1987 | Japan | . |
| 63-172389 | 7/1988 | Japan | . |

Primary Examiner—Joseph E. Clawson, Jr.
Attorney, Agent, or Firm—Armstrong, Nikaido, Marmelstein, Kubovcik & Murray

[57] ABSTRACT

A memory card is used on a card write and/or read apparatus which has a data bus with an arbitrary bit width and writes and/or reads a datum to and/or from the memory card. The memory card comprises a data input/output terminal, a memory part having a data bus with a bit width of at least n bits for coupling to the data bus of the card write and/or read apparatus via the data input/output terminal, an address input terminal for receiving an address signal, a first input terminal for receiving a first chip select signal which selects a first byte, a second input terminal for receiving a second chip select signal which selects a second byte, and a decoder circuit for determining a bit width of the data bus of the memory part to be used for data communication between the card write and/or read apparatus to one of n bits and n/N bits based on the first and second chip select signals and one or a plurality of arbitrary bits of the address signal by supplying control signals to the memory part, where n, N and n/N are positive integers.

11 Claims, 7 Drawing Sheets (A) CS0
(B) CS1
(C) A0
(D) CE1
(E) CE0

→ TIME

MEMORY CARD

BACKGROUND OF THE INVENTION

The present invention generally relates to memory cards, and more particularly to a memory card which has a memory function and has a shape of a credit card, for example.

There has been proposed a memory card which has no central processing unit (CPU) but has a built-in memory such as a random access memory (RAM) and a read only memory (ROM). For example, the memory card uses a data bus having a bit width of eight bits or sixteen bits, and there are proposals to use a data bus having a bit width which is a multiple of eight such as thirty-two bits and sixty-four bits. When such a memory card is loaded into a card write and/or read apparatus (hereinafter simply referred to as a card write/read apparatus), it is possible to write arbitrary information to the memory card and/or read prestored information from the memory card.

FIG. 1 shows an example of a conventional memory card. The memory card comprises an input buffer 100, a memory 101, an input/output buffer 102, and terminals 103 through 107. An address signal ADR is applied to the terminal 103, a write enable signal WE is applied to the terminal 104, a chip select signal CS is applied to the terminal 105, and an output enable signal OE is applied to the terminal 106. A write datum which is to be written into the memory 101 and a read datum which is read out from the memory 101 are input and output via the data input/output terminal 107. The input of the write datum is controlled by the input/output buffer 102 in response to the write enable signal WE. On the other hand, the output of the read datum is controlled by the input/output buffer 102 in response to the output enable signal OE.

According to the conventional memory card, the bit width of the data input/output terminal 107, that is, the bit width of a data bus, determines the card write/read apparatus to which the memory card may be loaded. In other words, a memory card which has a data bus with a bit width of eight bits is used exclusively on a card write/read apparatus having a data bus with a bit width of eight bits. Similarly, a memory card which has a data bus with a bit width of sixteen bits is used exclusively on a card write/read apparatus having a data bus with a bit width of sixteen bits. For this reason, when the bit width of the data bus of the card write/read apparatus is changed from eight bits to sixteen bits, it no longer becomes possible to use the memory card which has the data bus with the bit width of eight bits and the memory cards used on this card write/read apparatus must all have the data bus with the bit width of sixteen bits. As a result, an extremely large scale modification must be made in order to extend the functions of the card write/read apparatus because it is necessary to change all the memory cards.

Therefore, the bit width of the data bus of the card write/read apparatus conventionally determines the memory cards which may be used thereon. Thus, there is a problem in that a memory card which has a data bus with a bit width different from that of the card write/read apparatus cannot be used on this card write/read apparatus.

It is possible to consider enabling compatible use of the memory card which has the data bus with the bit width of sixteen bits on the card write/read apparatus which has the data bus with the bit width of eight bits and the card write/read apparatus which has the data bus with the bit width of sixteen bits. In this case, if the memory cards used have the data bus with the bit width of sixteen bits to start with, it is possible to continue using these memory cards even when the bit width of the data bus of the card write/read apparatus is changed from eight bits to sixteen bits to extend the functions thereof.

FIG. 2 shows another example of the conventional memory card. In FIG. 2, those parts which are substantially the same as those corresponding parts in FIG. 1 are designated by the same reference numerals, and a description thereof will be omitted. The memory card shown in FIG. 2 has a data bus with a bit width of sixteen bits. The memory card comprises two 256 k×8 bit RAMs $101_L$ and $101_H$, a terminal $105_L$ for receiving a chip select signal CS0 which selects a lower byte (that is, the RAM $101_H$), and a terminal $105_H$ for receiving a chip select signal CS1 which selects an upper byte (that is, the RAM $101_H$). The following Table 1 shows an operation mode of the memory card determined by the chip select signals CS0 and CS1, where "H" denotes a high logic level and "L" denotes a low logic level.

TABLE 1

| CS1 | CS0 | Operation Mode |
| --- | --- | --- |
| H | H | Non-Select |
| H | L | Lower Byte Select |
| L | H | Upper Byte Select |
| L | L | Word Access |

When the memory card shown in FIG. 2 is used on the card write/read apparatus having the data bus with the bit width of eight bits, it is necessary to generate the chip select signals CS0 and CS1 by providing a decoder circuit within the card write/read apparatus because the card write/read apparatus having the data bus with the bit width of eight bits originally does not have the function of generating the chip select signals CS0 and CS1. Accordingly, in this case, there is a problem in that the card write/read apparatus having the data bus with the bit width of eight bits must be redesigned extensively to incorporate the decoder circuit by taking into account a signal delay which occurs within the decoder circuit. Further, after such a redesigning is made, it no longer is possible to use the memory card which has the data bus with the bit width of eight bits.

SUMMARY OF THE INVENTION

Accordingly, it is a general object of the present invention to provide a novel and useful memory card in which the problems described above are eliminated.

Another and more specific object of the present invention is to provide a memory card for use on a card write and/or read apparatus which has a data bus with an arbitrary bit width and writes and/or reads a datum to and/or from the memory card, comprising data input/output terminal device, memory device having a data bus with a bit width of at least n bits for coupling to the data bus of the card write and/or read apparatus via the data input/output terminal device, address input terminal for receiving an address signal, first input terminal for receiving a first chip select signal which selects a first byte, second input terminal for receiving a second chip select signal which selects a second byte, and decoder for determining a bit width of the data bus of the memory device to be used for data communication between the card write and/or read apparatus to one of n bits and n/N bits based on the first and second chip select signals and one or a plurality of arbitrary bits of the address signal by supplying control signals to the memory device, where n, N and n/N are positive integers. According to the memory card of the present invention, it is possible to use the memory card on card write and/or read apparatus having data buses with different bit widths. In addition, it is possible to extend the functions of the card write and/or read apparatus without the need to modify the design of the card write and/or read apparatus.

Other objects and further features of the present invention will be apparent from the following detailed description when read in conjunction with the accompanying drawings.

DESCRIPTION OF THE PREFERRED EMBODIMENTS

Figure 1:
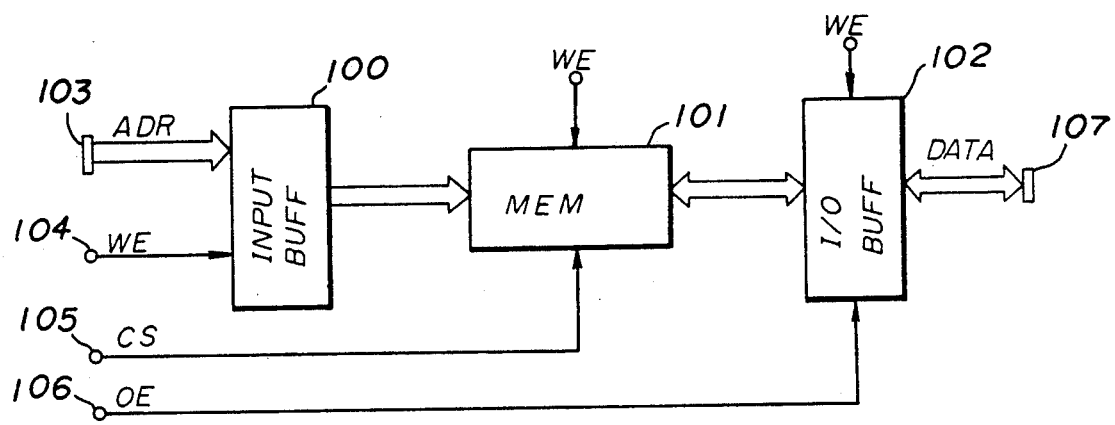
FIG. 1 is a system block diagram showing an example of a conventional memory card.
Figure 2:
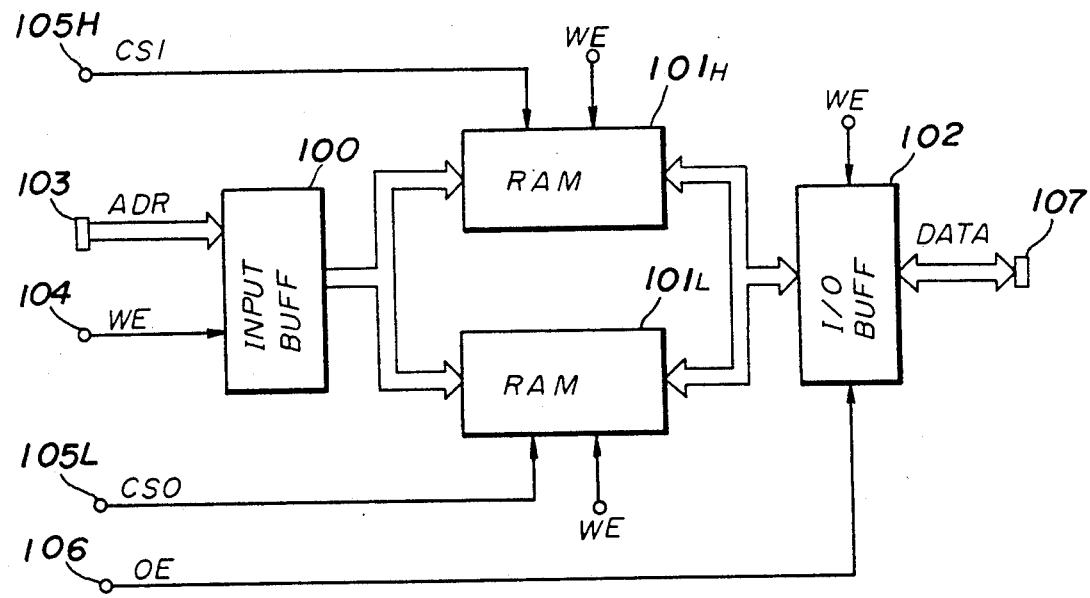
FIG. 2 is a system block diagram showing another example of the conventional memory card.
Figure 3:
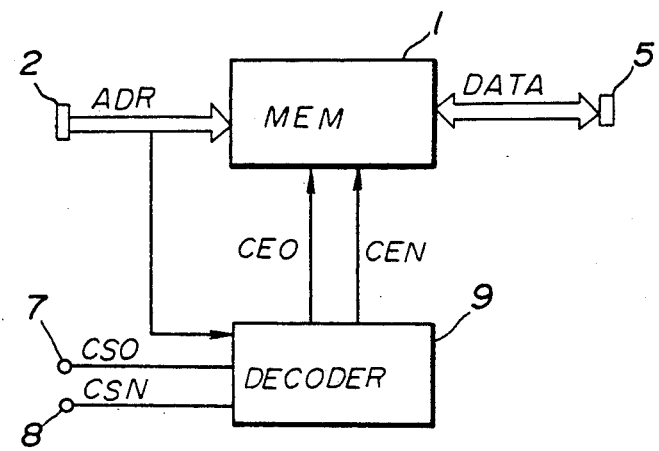
FIG. 3 is a system block diagram for explaining an operating principle of a memory card according to the present invention.

First, a description will be given of an operating principle of a memory card according to the present invention, by referring to FIG. 3. In FIG. 3, a memory card comprises a memory means 1 which has a data bus with a bit width of at least n bits, an address input terminal 2 for receiving an address signal ADR, an n-bit data output terminal 5 for outputting a read datum which is read out from the memory means 1, a first input terminal 7 for receiving a first chip select signal CS0 which selects a first byte, a second input terminal 8 for receiving a second chip select signal CSN which selects a second byte, and a decoder circuit 9.

The decoder circuit 9 generates control signals CE0 and CEN based on the first and second chip select signals CS0 and CSN which are received via the first and second input terminals 7 and 8 and a predetermined bit of the address signal ADR. The control signals CS0 and CSN control the bit width of the memory means 1 to n bits or n/N bits depending on a bit width of a data bus of a card write/read apparatus on which the memory card is to be used, where n, N and n/N are positive integers. Therefore, this memory card can be used on a card write/read apparatus which has a data bus with a bit width of n bits and a card write/read apparatus which has a data bus with a bit width of n/N bits. In other words, when n=16 and N=2, for example, the memory card according to the present invention can be used on a card write/read apparatus which has a data bus with a bit width of eight bits and a card write/read apparatus which has a data bus with a bit width of sixteen bits.

Next, a description will be given of a first embodiment of the memory card according to the present invention, by referring to FIG. 4. A memory card shown in FIG. 4 generally comprises an input buffer 11, 256 k×8 bit RAMs 12 and 13, an input/output buffer 14, a decoder circuit 15, and terminals 16 through 21.

Bits A0 through A18 of the address signal ADR are applied to the terminal 16, and the bit A0 is supplied to the decoder circuit 15 while the remaining bits A1 through A18 are supplied to the input buffer 11. A write enable signal WE is applied to the terminal 17 and is supplied to each of the input buffer 11, the RAMs 12 and 13 and the input/output buffer 14. An output enable signal OE is applied to the terminal 18 and is supplied to the input/output buffer 14. A chip select signal CS0 which selects the upper byte (that is, the RAM 12) is applied to the terminal 19 and is supplied to the decoder circuit 15. A chip select signal CS0 which selects the lower byte (that is, the RAM 13) is applied to the terminal 20 and is supplied to the decoder circuit 15.

Based on the bit A0 and the chip select signals CS1 and CS1, the decoder circuit 15 generates control signals CE0 and CE1 which are supplied to the respective RAMs 12 and 13. In this embodiment, when the logic values of the chip select signals CS0 and CS1 are the same, the memory bit width is set to sixteen bits regardless of the logic value of the bit A0. On the other hand, when the logic values of the chip select signals CS0 and CS1 are mutually different, the memory bit width is set to eight bits. When the memory bit width is set to eight bits, one of the the RAMs 12 and 13 is used depending on the logic value of the bit A0. In this embodiment, the RAM 12 is selectively used when the bit A0 has a low logic level and the logic values of the chip select signals CS0 and CS1 are mutually different. The following Table 2 shows the relationships of the chip select signals CS0 and CS1, the bit A0 and the control signals CE0 and CE1, where "H" and "L" respectively denote high and low logic levels and "X" denotes a don't care.

TABLE 2

| CS1 | CS0 | A0 | CE1 | CE0 |
|-----|-----|----|----|----|
| H | H | X | H | H |
| H | L | L | H | L |
| H | L | H | L | H |
| L | L | X | L | L |

Figure 5:
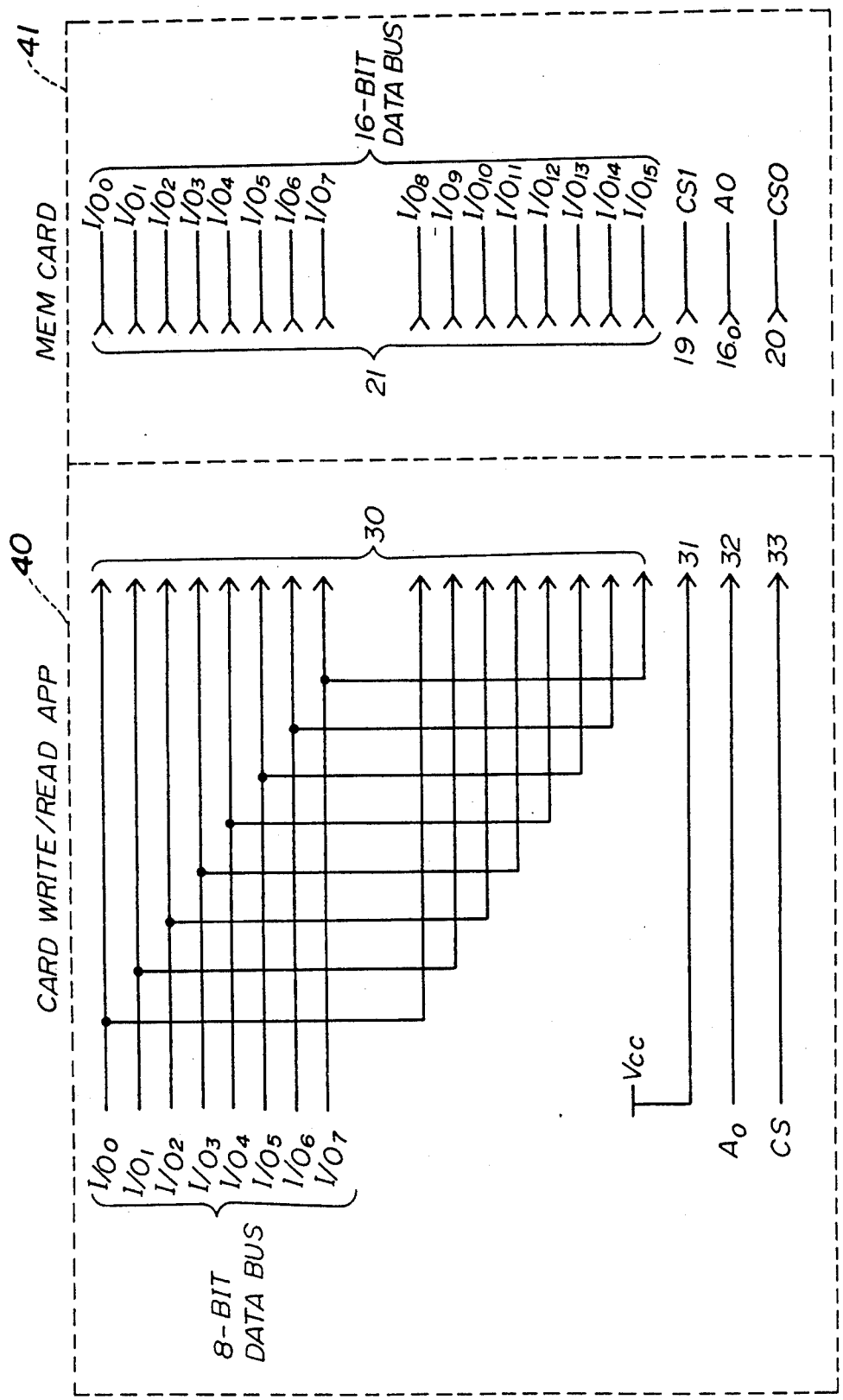
FIG. 5 is a diagram for explaining the use of the first embodiment of the memory card on a card write/read apparatus which has a data bus with a bit width of eight bits.

FIG. 5 is a diagram for explaining the use of the first embodiment of the memory card on a card write/read apparatus which has a data bus with a bit width of eight bits. In FIG. 5, only essential parts of a card write/read apparatus 40 and a memory card 41 are shown for the sake of convenience. As shown, the 8-bit data bus of the card write/read apparatus 40 is connected to a terminal 30 as if it were a 16-bit data bus. That is, the apparent bit width of the data bus is sixteen bits. The terminal 30 of the card write/read apparatus 40 is connected to the data input/output terminal 21 of the memory card 41. In addition, terminals 31, 32 and 33 of the card write/read apparatus 40 are respectively connected to the corresponding terminals 19, 16₀ and 20 of the memory card 41. The terminal 31 is connected to a power source voltage Vcc and is thus constantly fixed to the high logic level. The bit A0 of the address signal ADR is supplied to the terminal 32, and the chip select signal CS is supplied to the terminal 33.

Accordingly, in FIG. 5, the memory card 41 is used on the card write/read apparatus 40 as if it were a memory card having a data bus with a bit width of eight bits. Furthermore, there is no need to provide a decoder circuit or the like within the card write/read apparatus 40, and it is unnecessary to make a design modification of the card write/read apparatus 40 depending on the bit width of the data bus of the memory card.

Therefore, the memory card 41 can be used on a card write/read apparatus which has a data bus with a bit width of eight bits and a card write/read apparatus which has a data bus with a bit width of sixteen bits, without making a design modification on the card write/read apparatuses. For this reason, a memory card which has a data bus with a bit width of eight bits can still be used on the card write/read apparatus which has the data bus with the bit width of eight bits, and a memory card which has a data bus with a bit width of sixteen bits can still be used on the card write/read apparatus which has the data bus with the bit width of sixteen bits.

The following Table 3 shows the operation mode of the memory card, the state of the data input/output terminal 21 and the state of the power source current which are determined on the signals CS0, CS1, A0, OE and WE. In Table 3, "High Imp" denotes a high impedance state, and the same designations are used as in Table 2. Table 3 is divided into part A and part B due to the limited space.

TABLE 3A

| CS1 | CS0 | A0 | OE | WE | Operation Mode | State of PS Current |
|---|---|---|---|---|---|---|
| H | H | X | X | X | Non-Select | Stand-by |
| H | L | L | L | H | Read (x8 Bits) | Operating |
| H | L | H | L | H | Read (x8 Bits) | Operating |
| H | L | L | X | L | Write (x8 Bits) | Operating |
| H | L | H | X | L | Write (x8 Bits) | Operating |
| L | H | X | X | L | Write (x8 Bits) | Operating |
| L | H | X | L | H | Read (x8 Bits) | Operating |
| L | L | X | L | H | Read (x16 Bits) | Operating |
| L | L | X | X | L | Write (x16 Bits) | Operating |
| X | X | X | H | H | Output Disable | Operating |

TABLE 3B

| | | | | | State of Terminal 21 | |
|---|---|---|---|---|---|---|
| CS1 | CS0 | A0 | OE | WE | Upper Byte | Lower Byte |
| H | H | X | X | X | High Imp | High Imp |
| H | L | L | L | H | High Imp | Output Data |
| H | L | H | L | H | Output Data | High Imp |
| H | L | L | X | L | High Imp | Input Data |
| H | L | H | X | L | Input Data | High Imp |
| L | H | X | X | L | Input Data | High Imp |
| L | H | X | L | H | Output Data | High Imp |
| L | L | X | L | H | Output Data | Output Data |
| L | L | X | X | L | Input Data | Input Data |
| X | X | X | H | H | High Imp | High Imp |

Figure 6:
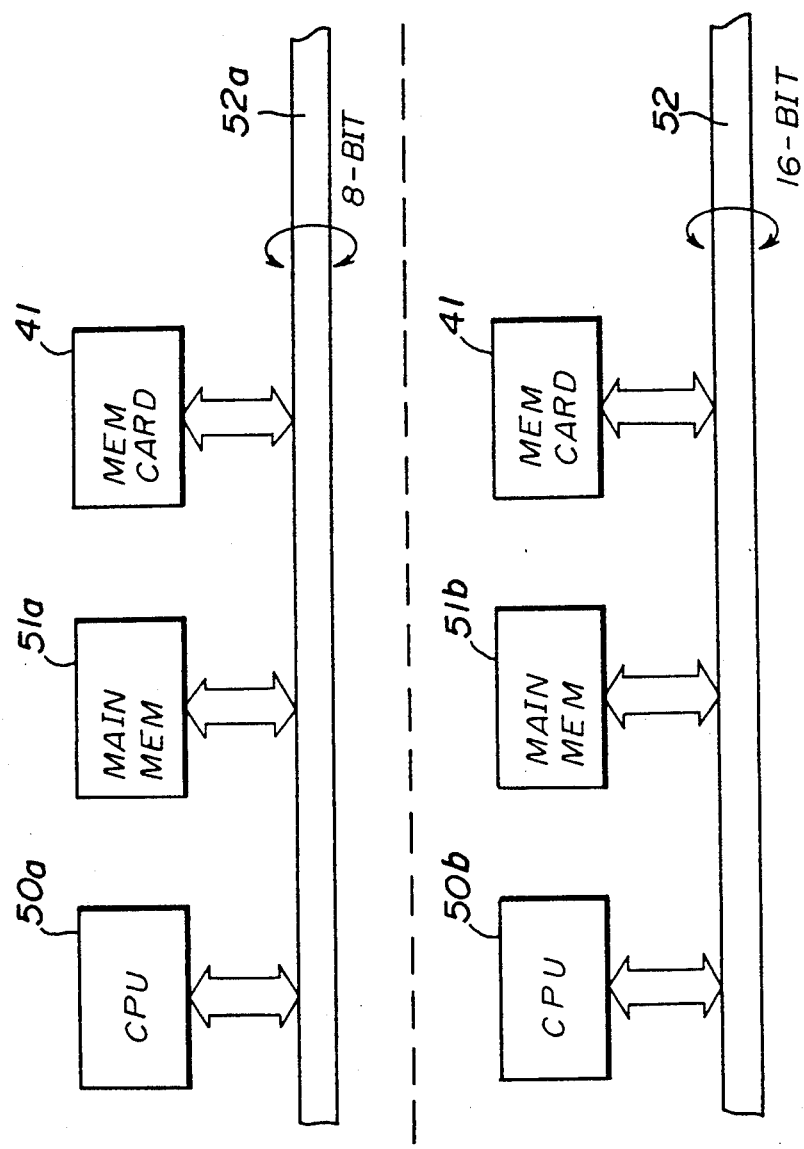
FIGS. 6A and 6B respectively show embodiments of the use of the first embodiment of the memory card.

FIGS. 6A and 6B respectively show embodiments of the use of the first embodiment of the memory card. FIG. 6A shows a case where the memory card 41 is used on a card write/read apparatus which has a CPU 50a, a main memory device 51a and an 8-bit data bus 52a, FIG. 6B shows a case where the memory card 41 is used on a card write/read apparatus which has a CPU 50b, a main memory device 51b and a 16-bit data bus 52b.

Figure 4:
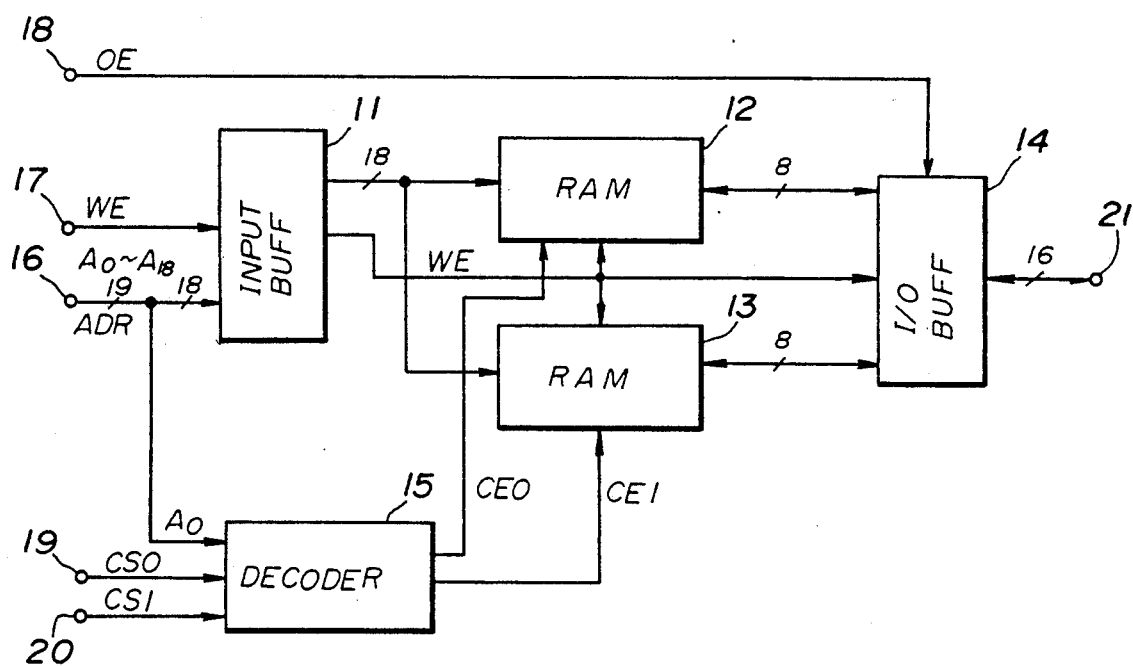
FIG. 4 is a system block diagram showing a first embodiment of the memory card according to the present invention.
Figure 7:
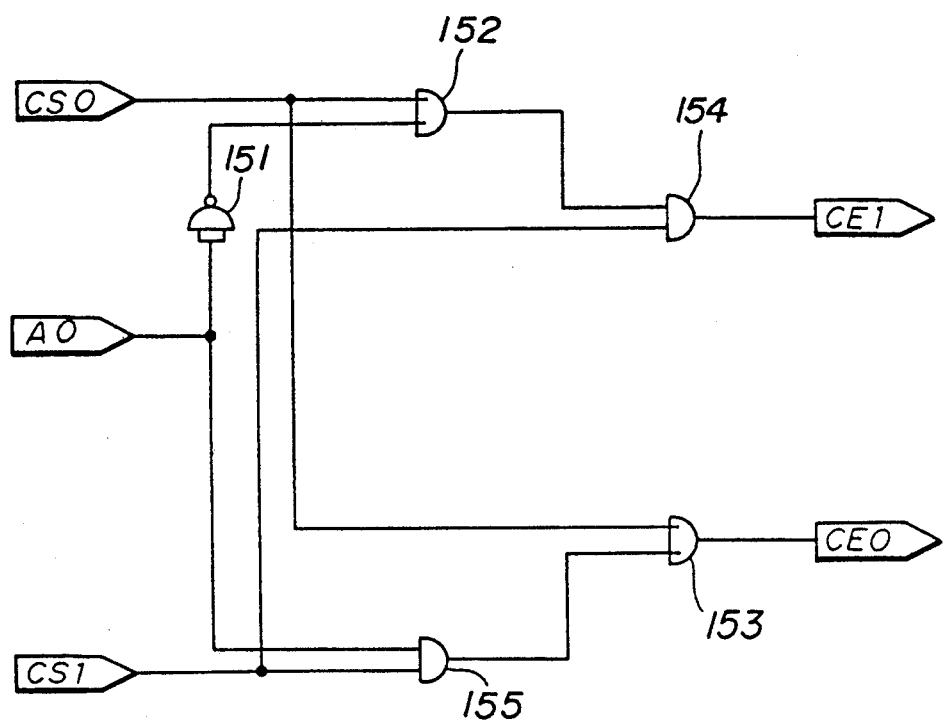
FIG. 7 is a circuit diagram showing an embodiment of a decoder circuit which may be used in the first embodiment of the memory card.

FIG. 7 shows an embodiment of the decoder circuit 15 shown in FIG. 4. The decoder circuit 15 comprises a NAND circuit 151, OR circuits 152 and 153, and AND circuits 154 and 155 which are connected as shown. The control signal CE0 is output from the OR circuit 153, and the control signal CE1 is output from the AND circuit 154.

Figure 8:
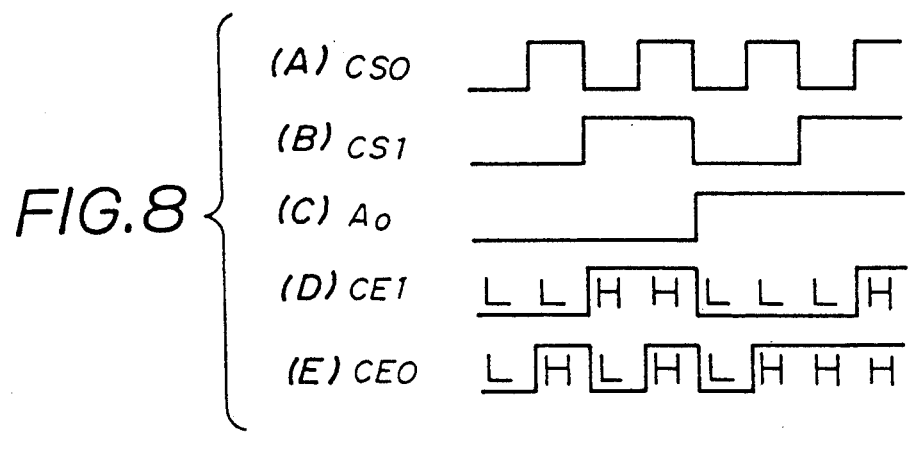
FIGS. 8(A) through 8(E) are timing charts for explaining an operation of the decoder circuit shown in FIG. 7.

FIGS. 8(A) through 8(E) show timing charts for explaining the operation of the decoder circuit 15 shown in FIG. 7 for different input signals CS0, CS1 and A0. FIGS. 8(A) and 8(B) respectively show the chip select signals CS0 and CS1, and FIG. 8(C) shows the bit A0 of the address signal ADR. FIGS. 8(D) and 8(E) respectively show the control signals CE1 and CE0 output from the decoder circuit 15.

Figure 9:
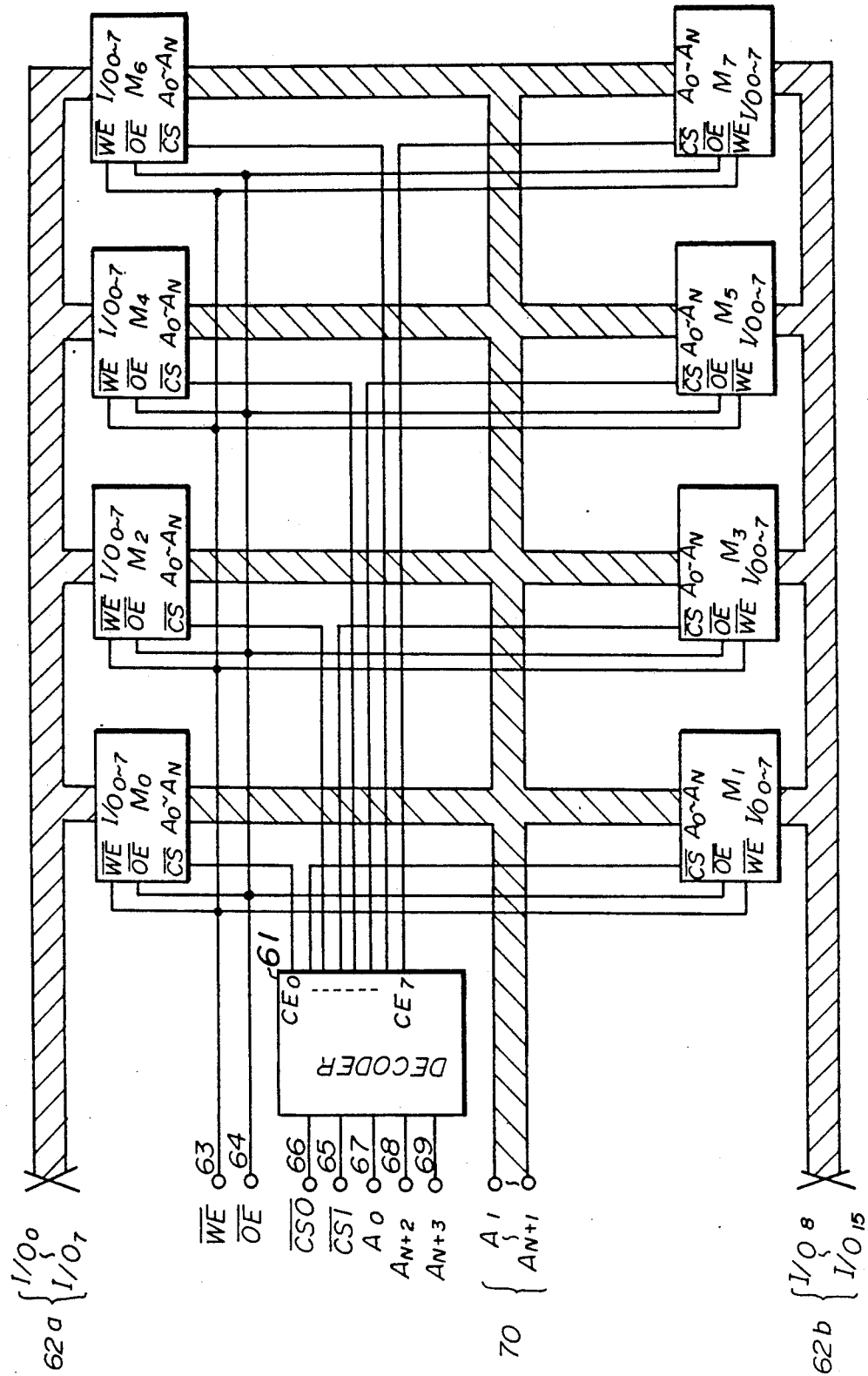
FIG. 9 is a system block diagram showing a embodiment of the memory card according to the present invention.

Next, a description will be given of a second embodiment of the memory card according to the present invention, by referring to FIG. 9. In this embodiment, a memory card comprises 8-bit memories M0 through M7, a decoder circuit 61, data input/output terminals 62a and 62b, and terminals 63 through 70. An upper byte made up of bits $I/O_0$ through $I/O_7$ of an input/output datum $I/O_0$ through $I/O_{15}$ is input and output via the data input/output terminal 62a, and a lower byte made up of bits $I/O_8$ through $I/O_{15}$ of the input/output datum $I/O_0$ through $I/O_{15}$ is input and output via the data input/output terminal 62b. A write enable signal $\overline{WE}$ is applied to the terminal 63, and an output enable signal $\overline{OE}$ is applied to the terminal 64. Chip select signals $\overline{CS1}$ and $\overline{CS0}$ are respectively applied to the terminals 65 and 66. Out of an address signal ADR made up of bits $A_0$ through $A_{N+3}$, bits $A_0$, $A_{N+2}$ and $A_{N+3}$ are respectively applied to the corresponding terminals 67, 68 and 69, while the remaining bits $A_1$ through $A_{N+1}$ are applied to the terminal 70. In this embodiment, there is provided no input buffer nor input/output buffer which correspond to those of the first embodiment. However, it is possible to obtain substantially the same effects as those obtainable by the first embodiment.

The bit width of the data bus is of course not limited to eight bits and sixteen bits. For example, the data buses may have bit widths of eight bits, sixteen bits and thirty-two bits.

Figure 10:
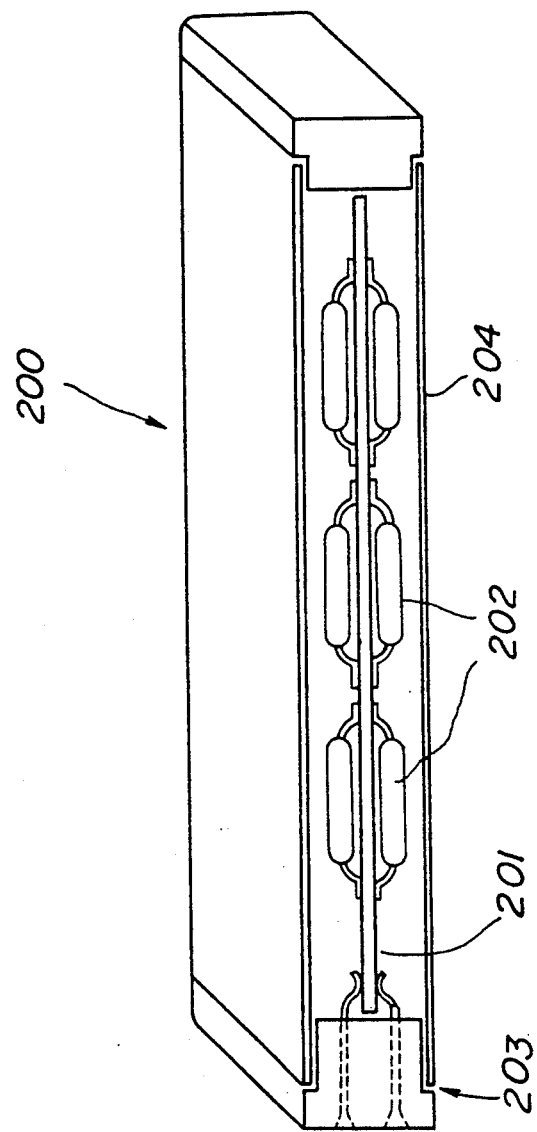
FIG. 10 is a perspective view generally showing an embodiment of an external appearance of the memory card.

FIG. 10 generally shows an embodiment of an external appearance of the memory card. In FIG. 10, a memory card 200 comprises a printed circuit 201, memory integrated circuits (ICs) 202 connected to the printed circuit 201, an interface connector 203, a cover 204 and the like.

Further, the present invention is not limited to these embodiments, but various variations and modifications may be made without departing from the scope of the present invention.

What is claimed is:

1. A memory card for use on a card write and/or read apparatus which has a data bus with an arbitrary bit width and writes and/or reads a datum to and/or from said memory card, said memory card comprising:

data input/output terminal means including data terminal of at least n×N bits;

memory means including a data bus, first memory means for storing data having a bit width n and second memory means for storing data having a bit width n, said data bus of said memory means including n×N bus lines and being connected to said data terminals, said first memory means having n data terminals which are connected to n bus lines out of the n×N bus lines, said second memory means having n data terminals which are connected to other n bus lines out of the n×N bus lines;

address input terminal means for receiving an address signal having a plurality of bits;

first input terminal means for receiving a first chip select signal for selecting one of said first and second memory means;

second input terminal means for receiving a second chip select signal for selecting one of said first and second memory means; and decoder means for determining a bit width of the data bus of said memory means to be used for data communication between the card write and/or read apparatus to one of n bits and n/N bits based on the first and second chip select signals and at least one bit of the address signal by supplying a first control signal to said first memory means and a second control signal to said second memory means, where n, N and n/N are positive integers, said first and second memory means being disabled and having a high impedance output when said first and second chip select signals have a first bit pattern, without regard to a logic value of said one bit of said address signal, said first and second memory means being enabled to output (n×N)-bit data to the data bus of said memory means when said first and second chip select signals have a second bit pattern, without regard to said logic value of said one bit of said address signal, one of said first and second memory means, corresponding to said logic value of said one bit of said address signal, being enabled to output an n-bit data to the data bus of said memory means and the other being disabled and having a high impedance output when said first and second chip select signals have a third bit pattern.

2. The memory card as claimed in claim 1 wherein said address signal and said first and second chip select signals are respectively received from the card write and/or read apparatus.

3. The memory card as claimed in claim 1 wherein said first memory means comprises a first n/2-bit output memory and said second memory means comprises a second n/2-bit output memory which respectively have an output of n/2 bits, said first and second n/2-bit output memories being enabled by the respective first and second control signals received from said decoder means and determining the bit width of the data bus used.

4. The memory card as claimed in claim 3 wherein n=16 and N=2, said first n/2-bit output memory being used for writing and reading a first byte of datum, said second n/2-bit output memory being used for writing and reading a second byte of the datum.

5. The memory card as claimed in claim 1 which further comprises a third input terminal means for receiving a write enable signal and input buffer means for receiving the first and second chip select signals and the write enable signals from said first, second and third input terminal means and the address signal from said address input terminal means, said input buffer means supplying the write enable signal and bits of the address signal excluding said one bit to said first and second memory means, write and read operations of said first and second memory means being enabled depending on a logic value of said write enable signal.

6. The memory card as claimed in claim 5, which further comprises fourth input terminal means for receiving an output enable signal and input/output buffer means coupled to said first and second memory means for receiving a datum to be written into said first and second memory means via said data input/output terminal means and for outputting a datum read out from said first and second memory means to said data input/output terminal means depending on a logic value of the output enable signal.

7. The memory card as claimed in claim 6 wherein said write enable signal and said output enable signal are respectively received from the card write and/or read apparatus.

8. The memory card as claimed in claim 1 wherein n=16 and N=2.

9. The memory card as claimed in claim 1 wherein said first and second memory means respectively comprise a plurality of n/2-bit output memories respectively having an output of n/2 bits, said n/2-bit output memories being respectively enabled by the control signals received from said decoder means.

10. The memory card as claimed in claim 1 wherein said first and second chip select signals have logic values which are selected depending on the bit width of the data bus of the card write and/or read apparatus which uses said memory card.

11. A memory card comprising:
data terminals for transferring M-bit data;
bus lines, connected to said data terminals, for transferring the M-bit data;
address input terminals receiving a plurality of bits of an address signal;
a first group of memory chips, connected to said address input terminals and a part of said bus lines, storing data having a bit width M/2;
a second group of memory chips, connected to said address input terminals and another part of said bus lines, storing a data having a bit width M/2;
a first terminal for receiving a first chip select signal for selecting one of said first and second groups of memory chips;
a second terminal for receiving a second chip select signal for selecting one of said first and second groups of memory chips; and
a decoder receiving the first and second chip select signals and at least one bit of the address signal, and supplying a first control signal to said first group of memory chips and supplying a second control signal to said second group of memory chips, wherein both of said first and second groups memory chips are enabled so that the M-bit data is supplied at a same time to the bit lines regardless of a content of said one bit of the address signal when the first and second chip select signals indicate a first bit pattern,
one of said first and second groups of memory chips being enabled and the other disabled in response to said content of said one bit of the address signal so that a M/2-bit data is supplied at the same time to the part of the bus lines when the first and second chip select signals indicate a second bit pattern.

* * * * *

UNITED STATES PATENT AND TRADEMARK OFFICE
CERTIFICATE OF CORRECTION

PATENT NO. : 5,025,415

DATED : June 18, 1991

INVENTOR(S) : MASUYAMA et al.

It is certified that error appears in the above-identified patent and that said Letters Patent is hereby corrected as shown below:

In Column 6, lines 65-66, delete "data terminal" and insert therefor --data terminals--;

line 66, after "n" delete "xN".

In Column 7, lines 2 and 4, delete "n" and insert therefor --n/N--;

line 5, delete "xN";

line 6, delete "n" and insert therefor --n/N--;

line 7, delete "n" and insert therefor --n/N--;

line 8, delete "xN";

line 9, delete "n" and insert therefor --n/N--;

line 10, delete "n" and insert therefor --n/N--, delete "xN";

line 22, delete "between" and insert therefor --with--;

line 23, delete "to" and insert therefor --as--;

line 25, delete "by" and insert therefor --and--;

line 35, delete "xN";

line 42, delete "n-bit" and insert therefor --n/N bit--.

UNITED STATES PATENT AND TRADEMARK OFFICE
CERTIFICATE OF CORRECTION

PATENT NO. : 5,025,415
DATED : June 18, 1991
INVENTOR(S) : MASUYAMA et al

It is certified that error appears in the above-indentified patent and that said Letters Patent is hereby corrected as shown below:

In Column 8, line 59, delete "bit" and insert therefor --bus--.

Signed and Sealed this

Fifth Day of December, 1995

Attest:

BRUCE LEHMAN

Attesting Officer

Commissioner of Patents and Trademarks